(12) United States Patent
Ishak et al.

(10) Patent No.: US 10,141,827 B2
(45) Date of Patent: Nov. 27, 2018

(54) ELECTROMAGNETIC TOROIDAL MOTOR

(71) Applicants: Benjamin Ishak, Aberdeen, MD (US);
Carter Ishak, Aberdeen, MD (US);
Alec Ishak, Westborough, MA (US);
Donald Vance, Lyndonville, VT (US)

(72) Inventors: Benjamin Ishak, Aberdeen, MD (US);
Carter Ishak, Aberdeen, MD (US);
Alec Ishak, Westborough, MA (US);
Donald Vance, Lyndonville, VT (US)

( * ) Notice: Subject to any disclaimer, the term of this patent is extended or adjusted under 35 U.S.C. 154(b) by 496 days.

(21) Appl. No.: 15/088,938

(22) Filed: Apr. 1, 2016

(65) Prior Publication Data

US 2017/0025938 A1    Jan. 26, 2017

Related U.S. Application Data

(60) Provisional application No. 62/142,782, filed on Apr. 3, 2015.

(51) Int. Cl.
*H02K 99/00*    (2014.01)

(52) U.S. Cl.
CPC .................... *H02K 99/20* (2016.11)

(58) Field of Classification Search
CPC ............... H02K 99/20; H02K 2201/18; F01L 2009/028
USPC ............... 310/20, 12.14; 123/90.16
See application file for complete search history.

(56) References Cited

U.S. PATENT DOCUMENTS

| | | |
|---|---|---|
| 3,394,295 A | 7/1968 | Cory |
| 3,703,653 A | 11/1972 | Tracy |
| 4,300,067 A * | 11/1981 | Schumann ............ H02K 53/00 310/103 |
| 4,626,717 A | 12/1986 | Hensing et al. |
| 5,175,462 A | 12/1992 | Yoshino et al. |
| 7,116,018 B2 | 10/2006 | Strobl |
| 9,995,284 B1 * | 6/2018 | Gutsche ................... F03G 3/08 |
| 2012/0299399 A1 * | 11/2012 | Baird ..................... H02K 33/00 310/20 |
| 2012/0301261 A1 * | 11/2012 | Krupyshev ....... H01L 21/67742 414/749.1 |
| 2018/0072120 A1 * | 3/2018 | Hunter .................... B60G 3/01 |

* cited by examiner

*Primary Examiner* — Terrance Kenerly
(74) *Attorney, Agent, or Firm* — Gordon Feinblatt LLC; Royal W. Craig

(57) ABSTRACT

The present invention is a machine in which the repulsion and attraction forces of moving electromagnets are utilized to power a series of linkages that ultimately turn a crank. The motor is controlled by an external computer system which distributes an electric current among the electromagnets. In order to reverse the polarities of the electromagnets, the direction of the current will be rapidly changing. This polarity reverse causes electromagnets to repel and attract. The magnets then oscillate along two swing arms that once swung because of both polarity attraction and repulsion, activate the linkages.

22 Claims, 4 Drawing Sheets

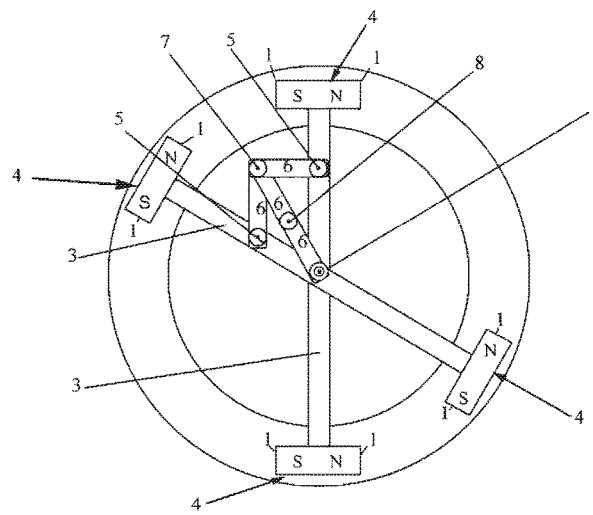
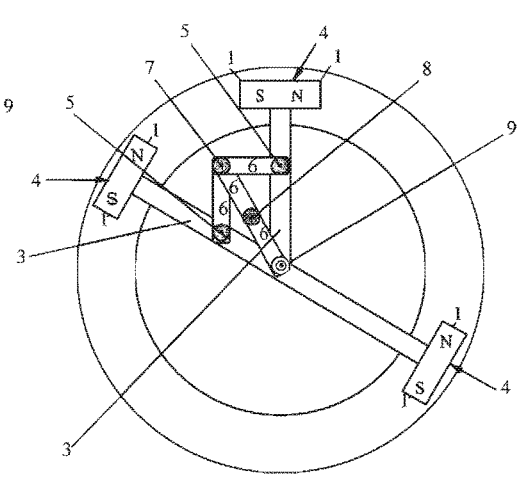
FIG. 5         FIG. 6
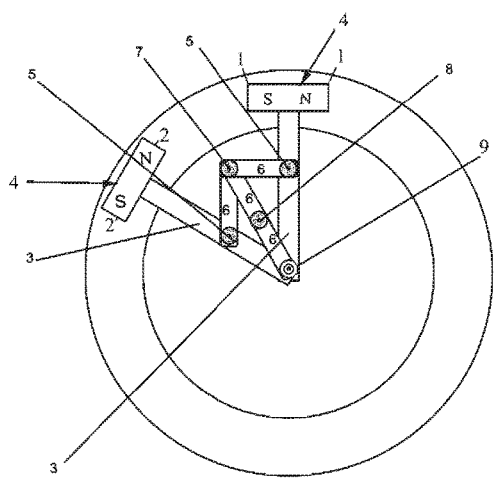
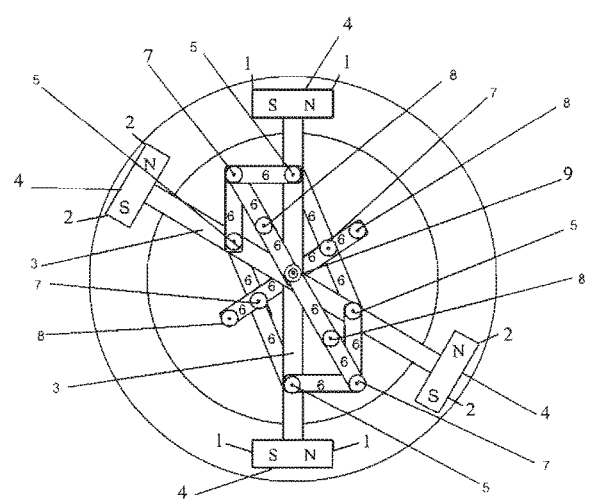
FIG. 7         FIG. 8

ELECTROMAGNETIC TOROIDAL MOTOR

CROSS-REFERENCE TO RELATED APPLICATION(S)

The present application derives priority from U.S. provisional application Ser. No. 62/142,782 filed 3 Apr. 2015.

BACKGROUND OF THE INVENTION

1. Field of the Invention

The present invention is directed to a motor utilizing electromagnetics by which it converts magnetic force into mechanical force 2. Description of the Background Toroidal motors are known brushless torque motors in which coils are wound about a toroidal annular iron core to form a stator portion. In 1909 the Beck Toroidal Engine was introduced at the Paris Air Show. This engine was a four piston, gas powered motor in which two arms activated a series of linkages and finally turned a crankshaft. Unfortunately, due to a mathematical mis-conversion the engine was never scaled to the correct size to power an aircraft. An electromagnetic example appears in U.S. Pat. No. 5,175,462 to Yoshino et al. issued Dec. 29, 1992, which shows a toroidal coil motor with an annular iron core.

The concept of a reciprocating armature rather than a rotor-armature is also well-known, and the prior art has used permanent magnets, electromagnets, or both in a toroidal motor to reciprocate an armature.

For example, U.S. Pat. No. 3,394,295 by Stanley A. Cory issued 23 Jul. 1968 shows an electromagnetic oscillating motor with electromagnets in the stator and permanent magnets in the armature. The '295 patent notes the efficiency advantage allot having to pass current to the armature via brushes.

U.S. Pat. No. 7,116,018 to Strobl (Johnson Electric) issued Oct. 3, 2006 shows an oscillating motor similar to Cory's with a rotor rotation of about 15 degrees.

U.S. Pat. No. 4,626,717 to Hensing et al. issued Dec. 2, 1986 shows an oscillating magnetic motor with two mallet-shaped armatures mounted on the motor shaft and pivotable independently of each other. The stator is electromagnetic whilst the armature uses permanent magnets. When the stator coils are energized with an alternating current it creates an oscillatory movement of the two mallet-shaped armatures about the motor shaft. There is no linkage inasmuch as the two armatures are intended for driving two pistons of a dual-piston compressor, or two blades of a shearing or cutting device.

The foregoing references use both permanent and electromagnets to oscillate an armature. The Hensing '717 reference in particular uses similar mallet-shaped rocker arms with permanent magnet heads driven to oscillate by electromagnets in the stator. The polarity of the electromagnets is switched causing the rocker aims to oscillate back-and-forth.

None of the foregoing patents employ any linkage. Linkages themselves are fairly well established, as shown by U.S. Pat. No. 3,703,653 to Robert Tracy issued Nov. 21, 1972. Tracy '653 shows an electromagnetic motor that uses solenoids to impose/remove aluminum shields between pairs of permanent magnets. The Tracy '653 patent describes a Star linkage to connect four pistons to a common camshaft. A similar Star linkage was typically used by Star or radial-type internal combustion engines employed by old airplanes with a radial array of pistons about the propeller.

None of the foregoing references use electromagnets on the armatures in combination with a linkage. In contrast, the prior art teaches away from an electromagnetic armature due to the difficulty and inefficiency of commutating it with brushes. In fact, no one has realized the potential efficiency gained by a toroidal motor that uses multiple reciprocating rocker arms mounted for rotation about a common axis, each rocker arm being equipped with a combination of electromagnetic coils and permanent magnets, and in which the rocker arms are caused to reciprocate by switching the polarity of the electromagnets. The present inventors have effectively eliminate the stator by using a combination of permanent magnets and opposed armatures, linking two armatures to a common shaft using a simple three-bar linkage. Several embodiments are disclosed in which the reciprocations from the multiple rocker arms are conveyed to a single camshaft by a mechanical linkage that optimizes its leverage in accordance with switching of the electromagnetic coils. The result is a highly-efficient brushless motor that is quiet and economical.

SUMMARY OF THE INVENTION

Accordingly, it is an object of the present invention to provide a toroidal motor that incorporates magnetic power to turn a crankshaft by various combinations of permanent magnets and electromagnets which activate linkages that in turn provide power to the crankshaft. The toroidal motor may rely on the electromagnetic power along or as an assist to a combustible fuel source such as, for example, gasoline, propane, natural gas, or diesel fuel.

It is another object to provide an improved brushless switched-current motor that is operated by both magnetic attraction and magnetic repulsion.

It is a further object of the invention to provide a brushless switched-current reciprocating motor with permanent magnet pole pieces and switched field coils which are energized to reciprocate multiple rocker arms.

It is a further object of the invention to provide a brushless switched-current motor as described above wherein reciprocations from the multiple rocker arms are conveyed to a single crankshaft by a mechanical linkage that optimizes its leverage in accordance with switching of the electromagnetic coils.

These and other features and benefits are achieved with an improved multimagnetic toroidal motor comprising at least two rocker arms mounted for rotation about a common axis. Both rocker arms have mallet-shaped heads at one or both ends with N/S poles, the magnets being a combination of fixed and/or switchable. The polarity of the electromagnets of one head are switched in sequence causing the rocker arms to oscillate back-and-forth. The oscillations from both arms are conveyed to a single uni-directional crankshaft by a three-bar mechanical linkage. The invention can revolutionize home power generation, providing each home with its own self sustainable power generation unit. Many other commercial applications are possible such as electric automobiles, etc.

For a more complete understanding of the invention, its objects and advantages, refer to the remaining specification and to the accompanying drawings.

BRIEF DESCRIPTION OF THE DRAWINGS

Other objects, features, and advantages of the present invention will become more apparent from the following detailed description of the preferred embodiment and certain modifications thereof, in which:

FIG. 5 illustrates another embodiment where one of the rocker arms 3 is double-sided (counterbalanced) and the other is single-sided.

FIG. 6 illustrates another embodiment where both rocker arms 3 are single-sided.

FIG. 7 illustrates another embodiment with a linkage system consisting of a series of binary links as in FIG. 1.

FIG. 8 illustrates another embodiment with four linkage systems each consisting of a series of binary links.

DETAILED DESCRIPTION OF THE PREFERRED EMBODIMENTS

Figure 1:
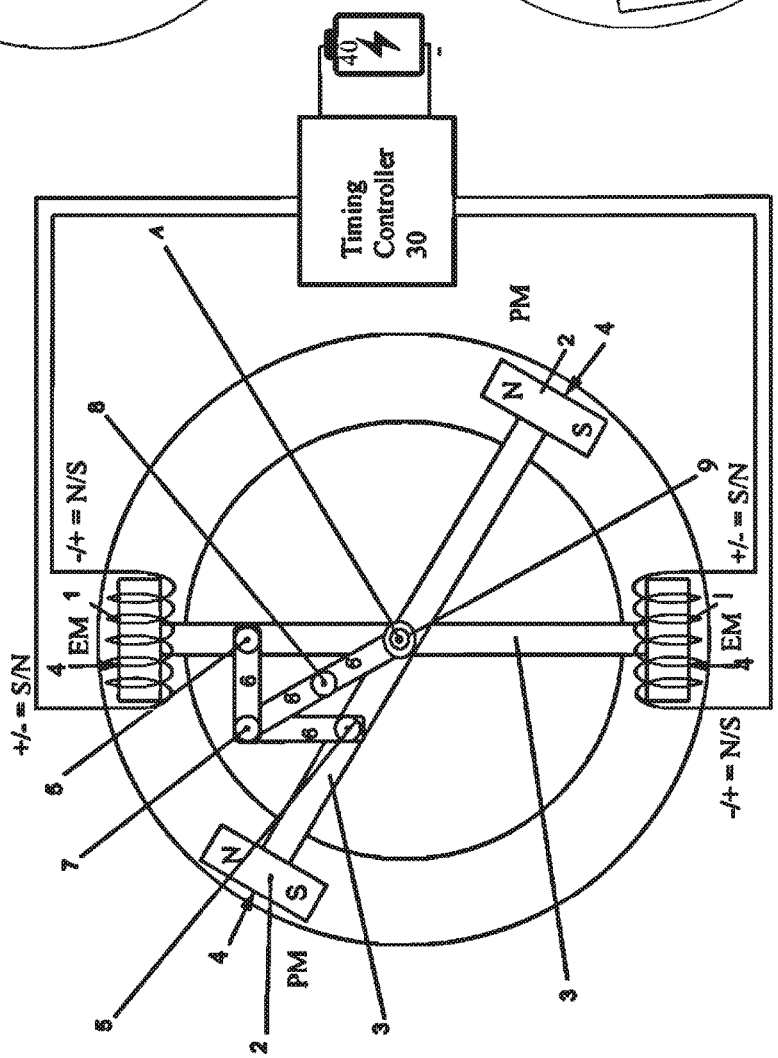
FIG. 1 is a front view of the multimagnetic toroidal motor according to the present invention mid-stroke.

As seen in FIG. 1, a multimagnetic toroidal motor generally comprises at least two counter-balanced rocker arms 3 each mounted for independent rotation about a common axis A, and each having bi-radial symmetry about A. Both rocker arms 3 are provided with heads 4 at both ends, the heads 4 preferably (but not necessarily) being cylindrical shaped mallet heads as shown. The mallet-shaped heads 4 define two opposite magnetic poles, the poles on one pair of mallet-shaped heads 4 of one rocker arm 3 being fixed and the poles of the other rocker arm 3 being switchable. This way, the mallet-shaped heads 4 can be controlled to attract or repel each other as they converge. Thus, the fixed-pole heads 4 are permanent magnetic (PM) heads 4 while the switchable heads 4 are electromagnetic magnetic (EM) heads 4 as shown.

Each PM head 4 further comprises opposing N/S permanent magnets 2 mounted on opposite sides of the head. The permanent magnets 2 used in the present invention are preferably rare-earth neodymium magnets with fixed poles. However, various other known types of permanent magnets ran be used in the invention as well.

Each EM head 4 further comprises switchable N/S electromagnets 1 preferably formed by a reversible-current coil mounted on the head 4 as shown. The electromagnets used in the preferred embodiment comprise a copper wire wrapped around a ferrous mallet-shaped core. However, one skilled in the art will understand that electromagnets 1 may be coreless. A coreless electromagnet is an electromagnet (coil of wire) without the conventional ferrous core, e.g., simply wound around nothing. Alternatively, electromagnets 1 may be non-magnetically advantageous, e.g., a coil of wire wound around a non-ferrous/non-magnetic core such as plastic or other nonmagnetic material that does not strengthen the magnetic field. There is an advantage to the use of coreless or non-magnetic-core electromagnets 1 in that permanent magnets 2 will not attract to the cores of the electromagnets 1 when the electromagnetic poles are intended to repel, depending on the timing of the motor.

Electricity flows through the copper wire in a given direction, thereby determining the polarity. Of course, most any other electromagnets or even switchable permanent magnets can be used provided they have switchable poles. In order to reduce heat generated by the electromagnets 1, the mallet-core of the electromagnets could be made of electrical steel. The ferrous core concentrates magnetic flux along the axis of the mallet-shaped EM head 4.

The rocker arms 3 are mounted for independent rotation about axis A, but are connected by a linkage mechanism. The illustrated linkage mechanism is a series of binary links, comprising four struts 6 pivotally connected together end-to-end as shown in a T-shaped configuration. The stem of the T-shaped binary linkage is connected to a unidirectional gear drive or unidirectional bearings, which are in turn connected to an output crankshaft 9 that rotates coaxially yet independently of the rocker arms 3. Thus, a pair of struts 6 are each pivotally connected at one end to single pivot points 5 approximately mid-height along each rocker arm 3, and are pivotally connected together at the other end at a triple pivot point 7. Another pair of struts 6 are each pivotally connected together at a double pivot point 8 and end-to-end from the triple pivot point 7 to the crankshaft 9. The struts 6 may be made of steel, aluminum, plastic, composite, fiber of any kind including carbon fiber, or any other material of any kind.

Figure 3:
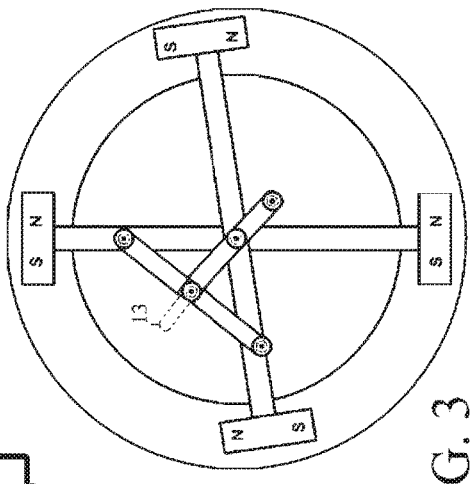
FIG. 3 is a front view of the multimagnetic toroidal motor of FIGS. 1-2 on the return stroke.

The pivot point where there are three ends of struts 6 connected at triple pivot point 7 is journaled into and runs along a track 13 (see FIG. 3). Track 13 may be a hole or a deep groove in the interior of motor housing. This track keeps the triple pivot point 7 moving in a linear direction.

The coils on the electromagnets 1 of EM heads 4 are connected to a timing controller 30, which may be a commercially-available programmable polarity reversal relay module. Timing controller 30 is connected to and derives power from a DC or AC power supply 40. Power supply 40 may be any suitable switched mode external power supply such as a battery, generator, or other known source. As an alternative the power supply 40 may be a conventional switched-mode power supply (SMPS), e.g., an electronic power supply that incorporates a switching regulator to convert electrical power efficiently. The timing controller 30 may be a suitable switching circuit that causes the SMPS power supply 40 to reverse polarity. This way, the SNIPS power supply will continually switch between low-dissipation, full-on and full-off states, and spend very little time in the high dissipation transitions, which minimizes wasted energy. Where an SNIPS is used the timing controller 30 may be an internal or external timing circuit or programmable computer to periodically reverse polarities of the electromagnets 1. Alternately, a mechanical timing device such as a mechanical distributor can be used for timing controller 30.

In general operation, the polarity of the electromagnets 1 on EM heads 4 are cyclically-switched by timing controller 30 causing the rocker arms 3 to oscillate back-and-forth within a fixed-angle rotation. The oscillations from both arms are conveyed to the single crankshaft 9 by the binary mechanical linkage of struts 6. To start the motor, a sequence of events occurs and is outlined as follows:

1) The external power supply 40 is activated;
2) Current from the external power supply 40 is directed by a timing controller 30 to specific electromagnets 1, +/− at top and −/+ at bottom. Once the current flows through the electromagnets 1, the electromagnets assume a S/N (top) and N/S (bottom) polar configuration as shown in FIG. 2.
3) The rocker arms 3 move closer, the electromagnets 1 being attracted toward the permanent magnets 2 of opposing polarity.

4) The initial starting motion causes the linkages 6 to activate and turn the crankshaft 9.
5) Once the electromagnets 1 have moved adjacent their corresponding permanent magnets 2, the timing controller 30 switches, reversing the direction of the current, causing the polarity of the electromagnets 1 to be reversed as well. What was originally the North Pole is now the South. This polarity reverse causes the electromagnets 1 to move away from their most proximate permanent magnet 2 and toward the opposing permanent magnet 2 as seen in FIG. 3.
6) The above-described process then repeats. In order to create a continuous spinning crankshaft 9, the external timing controller 30 synchronizes the rate of the reversing polarities of the electromagnets.

Figure 2:
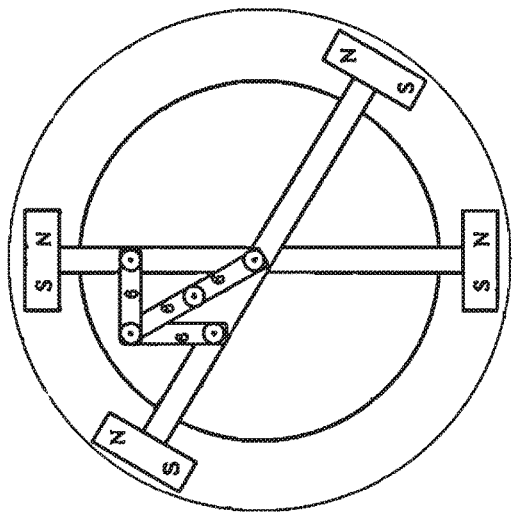
FIG. 2 is a front view of the multimagnetic toroidal motor of FIG. 1 end-of-stroke.

FIGS. 1 and 2 show the device mid-stroke. The leftmost PM rocker arm 3 provides S/N poles as shown, and when the electromagnets 1 of the rightmost EM rocker arm 3 are switched to provide N/S poles the mallet-shaped heads 4 repel each other forcing the rocker arms 3 rotate away from each other.

Figure 4:
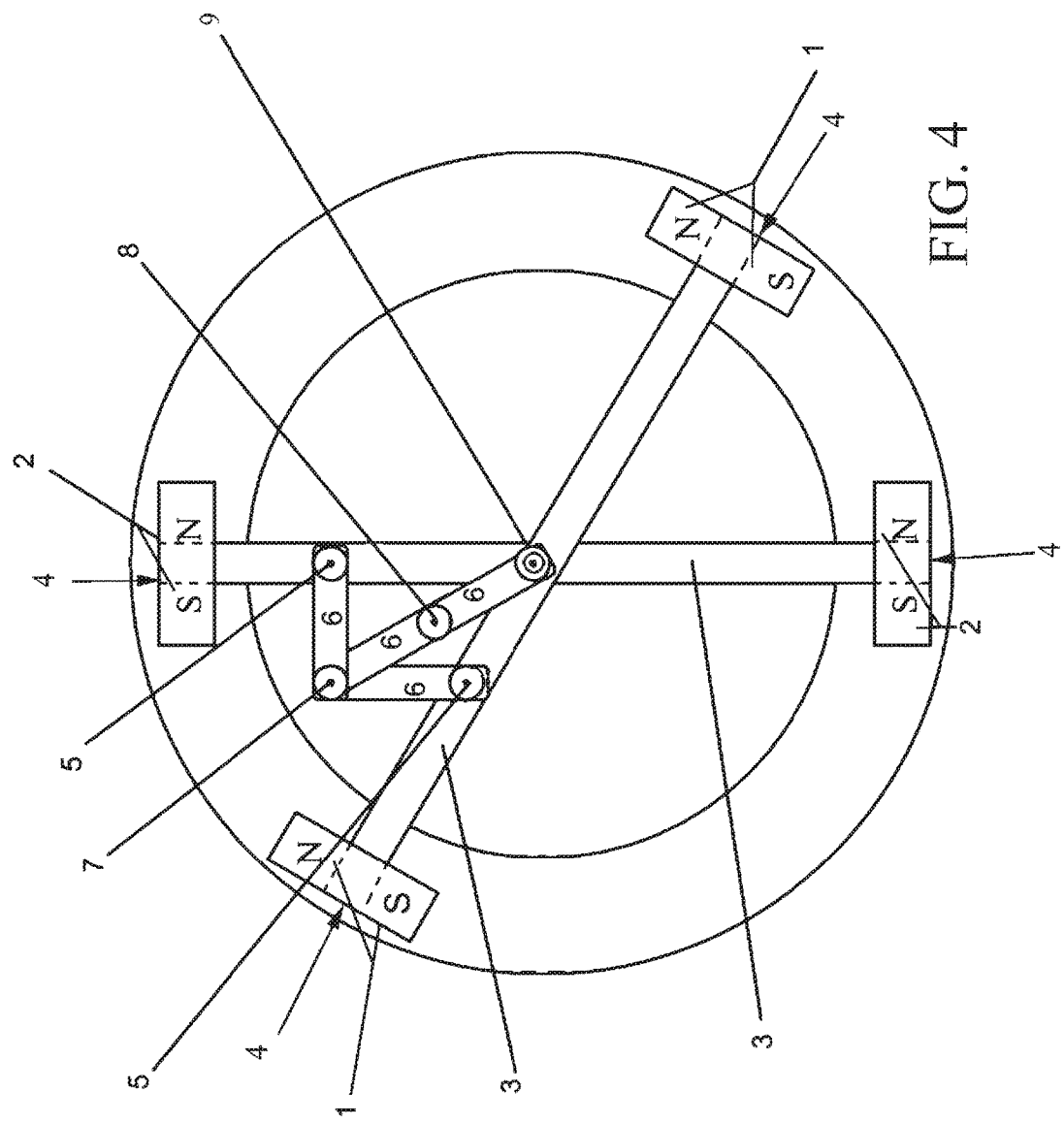
FIG. 4 illustrates another embodiment where all the heads 4 are EM heads incorporating switchable N/S electromagnets 1 mounted on opposite sides of the head.

As seen in FIG. 2, when the struts 6 pivotally connected between the rocker arms 3 become fully extended the momentum of the rocker arms 3 causes them to change rotational direction, now advancing back toward each other. However, the linkage system continues to rotate the crankshaft 9 clockwise, despite the reverse direction of the rocker arms 3. In addition, at this point the EM rocker arms 3 are again momentarily switched to provide S/N poles such that the mallet-shaped heads 4 attract each other. The rocker arms 3 rotate toward each other. After the initial start, the switching of the electromagnets 1 on EM rocker arms 3 is timed to coincide with the reversal of rotational direction, such that the electromagnets are only powered at the reverse points and are powered off there between. Alternatively, the electromagnets can be powered in between strokes, rather than at reverse points. In either case, the rocker arms 3 continue toward each other, and move past each other to the next reversal point as seen in FIG. 4. Switching and motion continues in this cyclic manner.

Various other embodiments as well as certain variations and modifications of the embodiments herein shown and described will obviously occur to those skilled in the art upon becoming familiar with said underlying concept.

For example, FIG. 5 illustrates another embodiment where all the heads 4 are EM heads incorporating switchable N/S electromagnets 1 mounted on opposite sides of the head.

FIG. 6 illustrates another embodiment where one of the rocker arms 3 is double-sided (counterbalanced) and the other is single-sided.

FIG. 7 illustrates another embodiment where both rocker arms 3 are single-sided.

FIG. 8 illustrates another embodiment with four linkage systems each consisting of a series of four binary links connected together end-to-end as shown in a T-shaped configuration.

Figure 9:
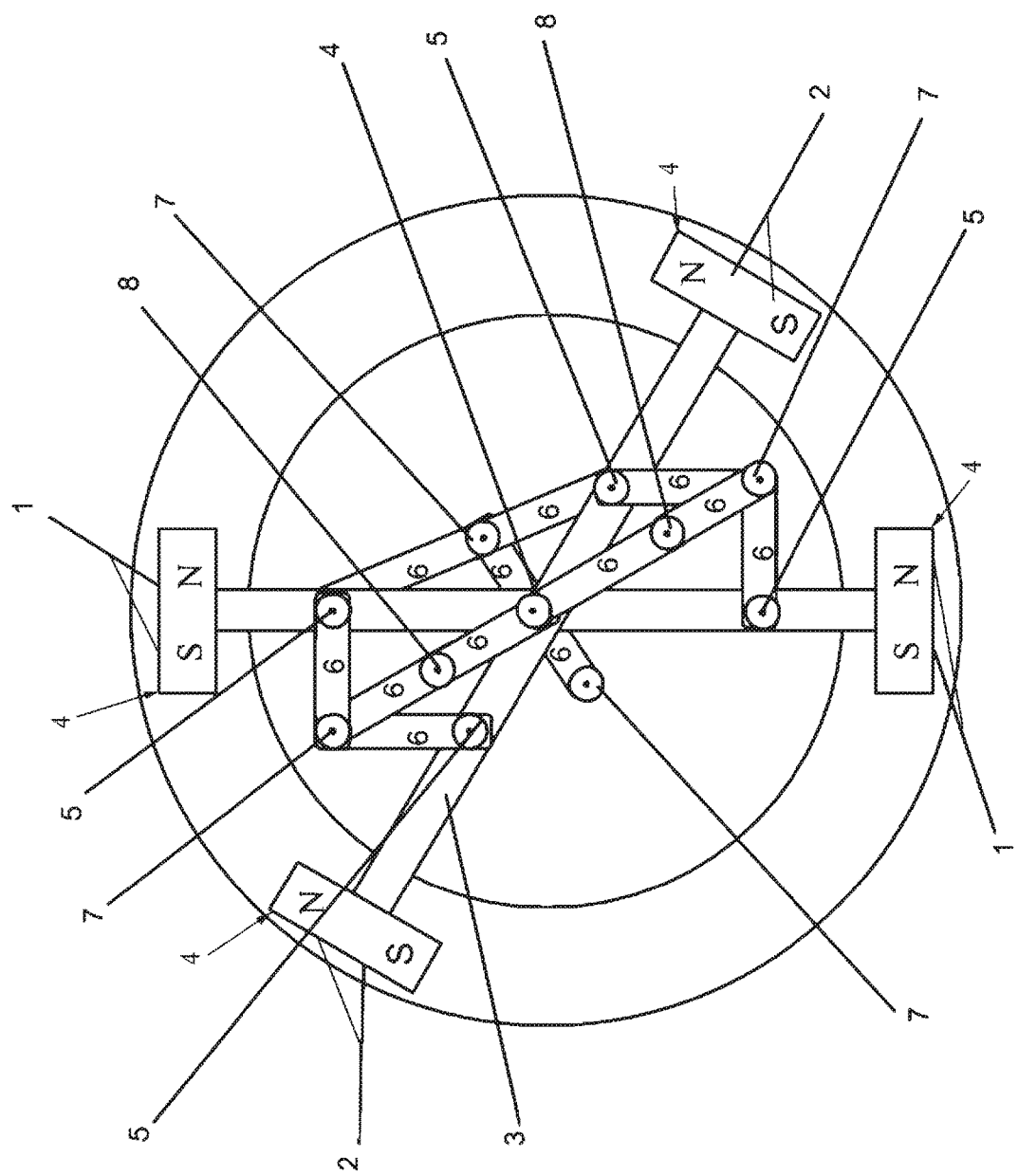
FIG. 9 illustrates another embodiment with three linkage systems each consisting of a series of binary links.

FIG. 9 illustrates another embodiment with three linkage systems each consisting of a series of binary links.

In addition, those skilled in the art will understand that lubrication or cooling of parts of the invention may be achieved with using conventional cooling and lubrication methods. It is to be understood, therefore, that the invention may be practiced otherwise than as specifically set forth in the appended claims.

We claim:

1. A motor, comprising:
a first rocker arm mounted for reciprocation about an axis and extending therefrom;
a second rocker arm mounted for reciprocation about said axis independent of said first rocker arm and extending therefrom;
a first magnetic head mounted distally at an end of said first rocker arm and including one or more permanent magnets of switchable-polarity electromagnets each having a coil-wound core;
a second magnetic head mounted distally at an end of said second rocker arm and including one or more switchable-polarity electromagnets each having a coil-wound core;
a power supply connected to the coils of said second magnetic head;
a switching circuit connected to said power supply for switching polarity of power applied to the coils of said second magnetic bead by said power supply;
a crankshaft mounted for unidirectional rotation about said axis independent of said first rocker arm and second rocker arm; and
at least one linkage mechanism pivotally connected to said first rocker arm, said second rocker arm, and to said crankshaft for translating reciprocation of said first rocker arm and second rocker arm into unidirectional rotation of said crankshaft.

2. The motor of claim 1, wherein said first rocker arm extends bilaterally on both sides of said axis and includes a third magnetic head mounted distally at another end of said first rocker arm.

3. The motor of claim 1, wherein said first rocker arm extends bilaterally on both sides of said axis and includes a third magnetic head mounted distally at another end of said first rocker arm.

4. The motor of claim 3, wherein said third magnetic head includes one or more permanent magnets.

5. The motor of claim 4, wherein said two permanent magnets are mounted distally on said first rocker arm in a mallet configuration.

6. The motor of claim 2, wherein said second rocker arm extends bilaterally on both sides of said axis and includes a fourth magnetic head mounted distally at another end of said second rocker arm.

7. The motor of claim 6, wherein said fourth magnetic head includes one or more switchable-polarity electromagnets each having a coil-wound core.

8. The motor of claim 7, wherein said two switchable-polarity electromagnets are mounted distally on said second rocker arm in a mallet configuration.

9. The motor of claim 1, wherein said linkage mechanism comprises a plurality of pivotally-connected links which create a crank.

10. The motor of claim 9, wherein said plurality of pivotally-connected links comprise two or more series of binary links.

11. A multimagnetic toroidal motor, comprising:
a first bi-laterally-extending rocker arm mounted for counter-balanced reciprocation about an axis;
a second bi-laterally-extending locker arm mounted for counter-balanced reciprocation about said axis independent of said first rocker arm;
said first rocker arm having a first pair of magnetic beads each mounted distally at an end of said first rocker arm, each one of said first pair of magnetic heads having a magnetic pole on one side and an opposite magnetic pole on another side;
said second rocker arm having a first pair of magnetic beads each mounted distally at an end of said second rocker arm, each one of said first pair of magnetic heads having a switchable magnetic pole on one side and an opposite switchable magnetic pole on another side;

a crankshaft mounted for unidirectional rotation about said axis independent of said first rocker arm and second rocker arm; and at least one linkage mechanism comprising a plurality of struts pivotally to said first rocker arm, to said second rocker arm, and to said crankshaft for translating reciprocation of said first rocker arm and second rocker arm into unidirectional rotation of said crankshaft.

12. The multimagnetic toroidal motor of claim 11, wherein said first pair of magnetic heads each comprise a permanent magnet.

13. The multimagnetic toroidal motor of claim 12, wherein said permanent magnets are rare earth magnets.

14. The multimagnetic toroidal motor of claim 12, wherein said second pair of magnetic heads each comprise an electromagnet with a core wound by coils.

15. The multimagnetic toroidal motor of claim 14, further comprising a power supply connected to the electromagnetic coils of the second pair of magnetic heads through a switching circuit that causes power to the coils to reverse polarity.

16. The multimagnetic toroidal motor of claim 14, wherein said core is cylindrical.

17. The multimagnetic toroidal motor of claim 11, wherein said at least one linkage mechanism comprises a first linkage having four struts pivotally connected together, one strut pivotally connected to said first rocker arm, one strut pivotally connected to said second rocker arm, and one strut operatively connected to said crankshaft for translating reciprocation of said first rocker arm and second rocker arm into unidirectional rotation of said crankshaft.

18. The multimagnetic toroidal motor of claim 17, wherein said at least one linkage mechanism comprises a second linkage having four struts pivotally connected together, one strut pivotally connected to said first rocker arm, one strut pivotally connected to said second rocker arm, and one strut operatively connected to said crankshaft for translating reciprocation of said first rocker arm and second rocker arm into unidirectional rotation of said crankshaft.

19. The multimagnetic toroidal motor of claim 17, wherein said at least one linkage mechanism comprises a third linkage having four struts pivotally connected together.

20. The multimagnetic toroidal motor of claim 11, wherein said first linkage comprises four struts, three of said four struts being pivotally connected together at a triple pivot point.

21. The multimagnetic toroidal motor of claim 20, wherein said first linkage comprises four struts, two of said four struts being pivotally connected together at a binary pivot point.

22. The multimagnetic toroidal motor of claim 21, further comprising a guide pin protruding from said triple pivot point, and a motor housing having an internal slot into which said guide pin protrudes.

* * * * *